United States Patent [19]

Bange

[11] 4,229,298

[45] Oct. 21, 1980

[54] METHOD AND APPARATUS FOR DETERMINING THE THICKNESS OF A CHARGE WALL FORMED IN A CENTRIFUGAL BASKET

[75] Inventor: Joseph B. Bange, Hamilton, Ohio

[73] Assignee: The Western States Machine Company, Hamilton, Ohio

[21] Appl. No.: 9,154

[22] Filed: Feb. 5, 1979

[51] Int. Cl.[2] .............................................. B01D 33/00

[52] U.S. Cl. ...................................... 210/787; 210/86; 210/96.1; 210/100; 210/746; 210/789

[58] Field of Search ................... 210/78, 86, 100, 96.1

[56] References Cited

U.S. PATENT DOCUMENTS

| | | | |
|---|---|---|---|
| 2,727,630 | 12/1955 | Hertaich | 210/100 |
| 3,011,641 | 12/1961 | Huser | 210/97 |
| 3,079,046 | 2/1963 | Goodwin | 222/52 |
| 3,141,848 | 7/1964 | Laven | 210/86 X |
| 3,189,268 | 6/1965 | Nilsson | 210/86 X |
| 3,420,374 | 1/1969 | Umeda | 210/86 |
| 3,559,808 | 2/1971 | O'Connor | 210/86 |

*Primary Examiner*—John Adee

*Attorney, Agent, or Firm*—Albert C. Johnston; Ronald A. Clayton

[57] ABSTRACT

A method for determining the thickness of a charge wall being formed against the side wall of a rotating centrifugal basket by flow of charge material into the basket comprises the steps of establishing a capacitance across the charge space of the basket and sensing any change of capacitance which results as the charge wall thickness is increased by the flow. An apparatus for determining the thickness of the charge wall formed against the side wall of the centrifugal basket includes an electrically conductive plate disposed in the basket inwardly of the charge space and a source of voltage for establishing an electric field between the plate and the side wall. A capacitance sensor senses any change in the established capacitance resulting from the formation of a charge wall in the basket.

25 Claims, 3 Drawing Figures

SOLENOID TO CLOSING SIDE CYLINDER
SOLENOID TO OPENING SIDE CYLINDER
RELAY
RELAY
F.F
F.F.
MAX. GATE POSITION REF.
ACTUAL GATE POSITION
MIN. GATE POSITION REF.
INTERMEDIATE LOAD REF.
ACTUAL LOAD
MAX. LOAD REF.
P1
P2
P3
P4
P5

METHOD AND APPARATUS FOR DETERMINING THE THICKNESS OF A CHARGE WALL FORMED IN A CENTRIFUGAL BASKET

The present invention relates to a new and improved method and apparatus for determining the thickness of a charge wall being formed against the side wall of a rotating centrifugal basket by flow of charge material into the basket. More specifically, this invention relates to a method and apparatus used to control the flow of material in order to accurately deliver in the shortest possible time the maximum desired amount into the basket that can efficiently be centrifuged by the centrifugal machine of which the basket forms a part.

The method and apparatus of the present invention have application in heavy cyclical centrifugal machines of the type used in the manufacture and refining of sugar. A common and costly drawback of many prior art centrifugal machines used in the processing of sugar is the inaccurate loading of the cylindrical basket. Such baskets should be loaded to their full capacity in order to maintain high production. However, baskets are frequently overloaded and charge material containing cyrstallized sugar is lost into channels provided for collecting impure syrup. Losses and inefficiencies of machine operation also result when variations in the volume of charge material introduced into the basket in successive centrifugal machine cycles occur since such variations affect the thickness of the basket charges and the effectiveness of the centrifugal machine to purge, wash and dry sugar in each charge.

Various automatic mechanisms have been proposed in the past for regulating the delivery of charge material into centrifugal baskets. Typically, such mechanisms control operation of a loading gate which regulates delivery of charge material into the centrifugal basket, and operate to hold the loading gate open at a set position as the basket fills. The gate is usually closed either after a preset period of time or when the basket charge has reached a certain final thickness.

Operation of the loading gate based on preset loading periods is generally unacceptable because the amount of charge material delivered to the basket is often not uniform from cycle to cycle. Such non-uniformity results primarily because the charge material undergoes changes in fluidity during processing of a given batch of massecuite or magma by reason of temperature changes or continued crystallization or settling of crystals from sugar syrup. Mechanical control devices that operate in response to the final charge thickness may also fail to produce uniform basket charges from one cycle to the next because varying amounts of material may enter the basket when the loading gate is closed in response to the final measured charge thickness depending upon the fluidity of the material and the distance between the loading gate and the basket.

Proposals have also been made to minimize the problems in loading the basket of a centrifugal machine with charge material. For example, U.S. Pat. No. 2,727,630 (Hertrich) discloses a mechanism that includes a charge measuring device that is changed in its position or condition of actuation as the volume of the basket charge increases during loading of the basket. The loading gate is progressively closed as the charge measuring device indicates progressively increasing charge thickness in the centrifugal basket. As the basket charge approaches the final desired volume, the gate is maintained at a pinched or largely closed position. When the final desired volume is actually reached, the gate is quickly closed so that a limited amount of material can flow through the gate as it closes from the pinched to the fully closed position, the limited amount not being enough to cause objectionable deviation from the final desired charge volume.

Other proposals have been made for controlling the amount of charge material delivered to the basket in cyclical centrifugal machines. For example, U.S. Pat. No. 3,011,641 (Huser) discloses a mechanism for preventing overloading of the basket having a manually controlled loading gate. U.S. Pat. No. 3,079,046 (Goodwin) discloses a mechanism for compensating the open position of the loading gate in accordance with the pressure conditions existing in the spout of a magma supply tank resulting from charge in the hydrostatic pressure head in the tank. U.S. Pat. No. 3,141,846 (Laven, Jr.) discloses a mechanism for controlling the thickness of charges formed in a rotating basket of a centrifugal machine that includes a mechanical charge feeler movable within the basket to be engaged by the charge wall.

It is an object of the present invention to provide a method and apparatus for determining the thickness of a charge wall being formed against the side wall of a centrifugal basket by flow of charge material into the basket which is both accurate and reliable.

It is a further object of the invention to provide an apparatus that does not employ mechanical means for determining the thickness of a charge wall but rather employs electrical means that are compact and do not interfere with or obstruct any other mechanism or operation of the centrifugal machine.

A further object of the invention is to provide a method and apparatus in which flow of material into the basket may be controlled in response to the determined thickness of the charge wall. Moreover, flow is controlled by a loading gate that may be operated in one of three modes selected for most efficient machine operation depending upon the nature of the material being centrifuged.

In the preferred embodiments, the method and apparatus of the present invention determine the thickness of a charge wall being formed against the side wall of a rotating cylindrical basket by flow of a charge material into the basket by establishing a capacitance across the charge space of the basket and sensing change of the capacitance that results as the charge wall thickness is increased by the flow. More specifically, the capacitance is established by forming an electric field between the side wall and an electrically conductive plate disposed inwardly of the charge space. When the capacitance reaches a value corresponding to a desired maximum thickness of the charge wall, flow of material into the basket is discontinued by moving a loading gate from an open to a closed position.

The loading gate may be operated between its open and closed positions in one of three modes. In particular, the flow may be discontinued by closing the loading gate rapidly from the open position to a largely closed or pinched position when capacitance reaches a value near its value at the desired maximum charge wall thickness and thereafter rapidly closing the loading gate to its closed position from the pinched position when the capacitance reaches a value corresponding to the desired charge wall thickness. In a second operating mode, the gate may be closed rapidly from its open to its closed position when the capacitance reaches a value corresponding to the desired maximum thickness of the charge wall. In a third operating mode, the loading gate may be closed gradually from its open to its pinched or largely closed position as the charge wall is gradually formed to a thickness near the desired maximum wall thickness and thereafter from the pinched position quickly to the closed position when the capacitance reaches a value corresponding to the desired maximum thickness.

The preferred embodiment of the apparatus of the present invention comprises the electrically conductive plate disposed in the basket inwardly of the charge space and a source of voltage for establishing an electric field between the plate and the side wall of the basket. A capacitance sensor connected to the plate and basket side wall generates a control signal proportionate to the sensed capacitance which is used to control operation of a loading gate as noted above. This sensor includes a bridge circuit that is balanced at a value of capacitance existing when the charge space contains only air.

The apparatus of the present invention is compact and does not rely upon mechanical feeler device making contact with charge material forming on the inside of a centrifugal basket during loading thereof. Accordingly, the sensor accurately determines the thickness of charge material formed against the basket wall and thus can accurately control operation of the loading gate to deliver the desired amount of material to the centrifugal basket.

By providing electric means for determining charge thickness, the loading gate may advantageously be controlled to operate in one of three modes selectable by an operator to suit the particular conditions and materials which are being operated on by the centrifugal machine.

Other objects, features and advantages of the present invention will be pointed out and will be understood from the following detailed description taken in conjunction with the accompanying drawings described below.

Figure 1:
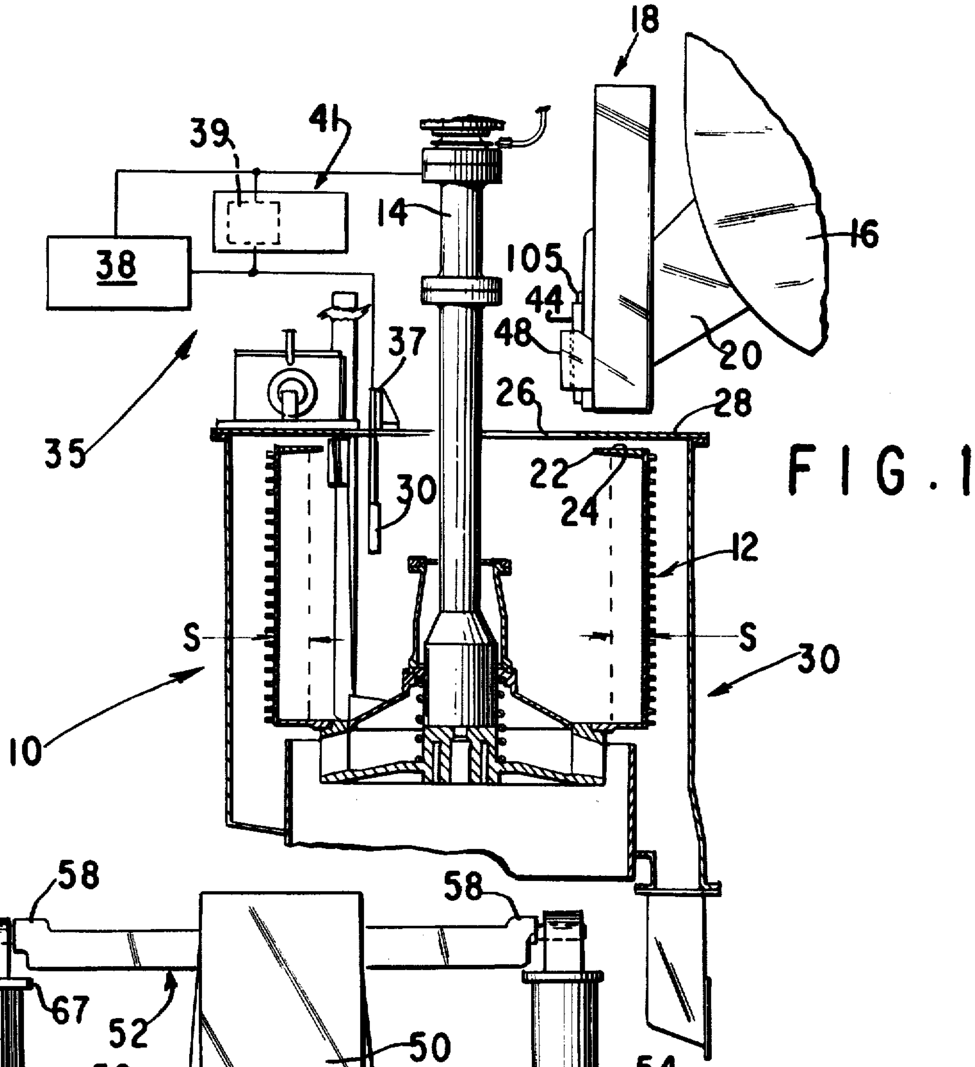
FIG. 1 is a side elevational view, taken partly in cross-section, of a centrifugal machine that incorporates the apparatus of the present invention for determining the thickness of a charge wall formed in the basket of the machine.

FIG. 1 illustrates a portion of a heavy cyclical centrifugal machine generally indicated at 10, that incorporates the apparatus of the invention for determining the thickness of the charge wall formed against the side wall of a centrifugal basket. The machine comprises the cylindrical basket 12 which is carried on a spindle 14 that is suspended for gyratory motion from a gyratory head (not shown) and is rotated by a rotary prime mover (also not shown) at high centrifuging speed and at lower speeds during other phases of cyclical machine operation. Charge material is delivered from a storage or supply tank 16 by a loading gate assembly generally indicated at 18 that is mounted at the mouth of a chute 20 communicating with the interior of the tank 16. The material delivered from the loading gate passes into the basket through a central opening 22 in the top wall 24 therein and through a concentric central opening 26 formed in the top wall 28 of a cylindrical curb structure 30 that surrounds the basket.

Charge material, which comprises both solid and liquid portions is typically delivered to the basket while it is rotated by the prime mover. The charge material, therefore, forms a cylindrical charge wall against the side wall of the basket in a basket charge space S. When the charge is centrifuged, liquid material passes through perforations in the side wall of the basket to be collected by the curb structure and the solid material is retained therein. The present invention is directed to a method and apparatus for determining the thickness of the charge wall so formed as an indication of the amount of material delivered to the basket and for controlling the loading gate in response to the determined charge thickness to accurately load the basket with a maximum desired amount of material in the shortest possible time given the characteristics of the charge material.

As can be seen in FIG. 1, the apparatus of the invention generally indicated at 35 comprises an electrically conductive plate 36 suspended from a bracket 37 that is secured to top wall 28 of the curb structure. The plate is thereby disposed inside of the basket inwardly of the charge space S at a location selected to avoid interference with other components of the machine and flow of material from the loading gate. The plate 36 is mounted so that it is substantially parallel to the side of the basket wall.

The plate and the side wall of the basket are electrically connected to a source of voltage diagrammatically indicated at 38 for forming an electric field between the plate and the side wall. Accordingly, a capacitance is established across the charge space S between the plate and the side wall of the basket. Because the charge material fed to the basket has a different dielectric constant than air, interposition of charge material between the side wall of the basket and the plate changes the capacitance established across the charge space S. The capacitance will also vary with the thickness of charge material between the plate and side wall of the basket. Therefore, by sensing changes in capacitance, changes in the thickness of charge material in the basket are determined. This sensing apparatus is then used for controlling the loading gate to move to certain preset positions at different stages of loading of the basket, as will be described in greater detail below.

A bridge circuit 39 is connected with the side wall of the basket 12 and the plate 36 and is balanced at a value of the capacitance established therebetween existing when the charge space contains only air. The bridge circuit may form a portion of a Drexelbrook capacitance control unit 41 available from the Drexelbrook Engineering Company, Horsham, Pa., that is designed to generate a control signal which varies in magnitude with the change of a sensed capacitance. Moreover, the control unit 41 is arranged in a failsafe manner in the apparatus of the invention whereby the absence of a control signal indicates that the charge wall has reached at least the maximum desired thickness corresponding to a fully loaded basket. Such a control signal indicating a fully loaded basket causes the loading gate to close. Therefore, in the event of a power failure the loading gate will close to avoid injury to operators, damage to the machine and/or loss of raw material. The signal generated by the unit 41 ranges from approximately 28 milliamperes to approximately 4 milliamperes respectively, indicating charge thicknesses corresponding to an empty and a fully charged basket.

The control unit is connected to the loading gate control circuit, illustrated in FIG. 3, which controls operation of the loading gate shown in FIG. 2 and described subsequently.

Figure 2:
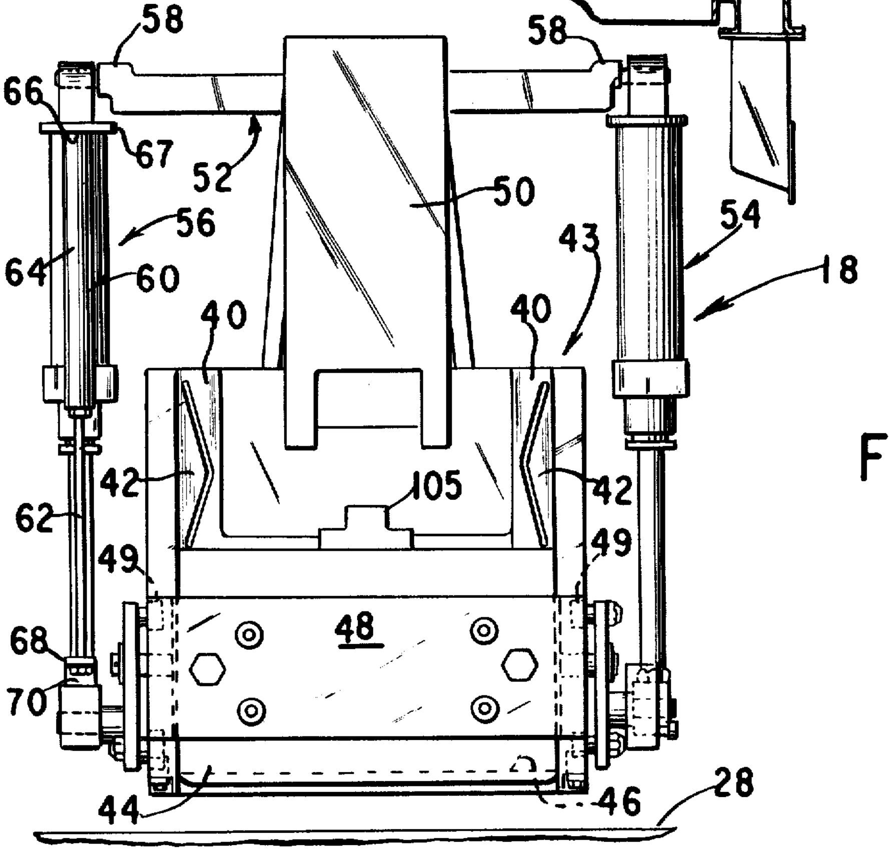
FIG. 2 is an enlarged elevational view of the loading gate which controls delivery of the charge material into the basket.

FIG. 2 illustrates in greater detail the loading gate that is controlled by the capacitor apparatus that determines the thickness of charge material formed in charge space of the centrifugal basket. The loading gate assembly 18 which may be constructed in accordance with Patent Application Ser. No. 936,117 comprises a gate body 43 secured to the chute 20 and having a forward end wall or facing 40 that includes a section encircling the outlet 46 of the chute and a slideway 42 formed to one side of the outlet of the chute. A loading gate 44 is mounted to slide on the facing 40 between a closed position covering the outlet 46 of the chute 24 and an open position displaced upwardly from the outlet 46 on the slideway 42 or to any position between the open and closed positions.

Sliding movement of the loading gate 44 is effected by an operating mechanism that includes a crosshead 48 that extends transversely across the outer front face of and is linked to the gate 44 and provided with end portions 49, shown by phantom lines, that loosely embrace the outer side margins (not shown) of the gate body 43. A central standard 50 is mounted above and extends vertically from the gate body 43 and supports a tie bar 52 that extends horizontally from both sides of the standard. A pair of power driven devices, specifically pressurized fluid actuated piston and cylinder devices 54 and 56, interconnect the outer ends 58 of the tie bar 52 and the rearwardly projecting end plates of the crosshead.

Each piston and cylinder device is double acting and may be actuated by a source (not shown) of pressurized fluid, such as compressed air. Application of pressurized air to one side of the pistons in the cylinders forces the crosshead and, hence, the gate downwardly to its fully closed position. Application of pressurized fluid to the opposite side of the pistons moves the respective parts upwardly to move the loading gate to an open position. Simultaneous application of equal pressures to both sides of the pistons in the cylinders causes the loading gate to stop at any position intermediate the open and closed positions.

The loading gate assembly also includes a linear transducer 60 having a rod 62 that telescopes into a gate position signal generating device 64 such as a linear potentiometer. The device 64 is attached at its upper end 66 to a bracket 67 secured to the cylinder of device 56. The lower end 68 of the rod 62 is attached to a bracket 70 secured to the piston of the device 56. Accordingly, when the loading gate is moved between its open and closed positions, the rod 62 telescopes into the device 64 which produces a gate position signal that indicates the exact position of the loading gate.

The signal generated for determining the thickness of a charge wall and, hence, the amount of charge material loaded into the centrifugal basket and the signal generated by transducer 60 are used to regulate movement of the loading gate to accurately fill the basket. Moreover, the loading gate may be operated to do so in any one of the following three modes:

1. Open-shut mode of operation

When the basket has been suitably prepared to receive charge material, the loading gate is opened rapidly to a preset maximum open position and remains there. When the signal produced by the device for determining charge thickness indicates that the basket has been fully loaded, the loading gate is closed rapidly from its maximum open to its completely closed position.

2. Servo mode of operation

After suitable preparation of the basket to receive charge material, the loading gate is opened to its preset maximum position. As charge material is added to the basket and forms a wall on the side wall thereof, and as the charge thickness determining apparatus generates a signal indicative of increased wall thickness, the loading gate is gradually moved toward a pinched or largely closed position. The control mechanism for operating the gate is arranged to cause the loading gate to reach its pinched position as the basket charge approaches its final desired volume. The gate is held at its pinched position until the charge thickness determining apparatus indicates that the basket has been fully loaded, at which time the gate is closed rapidly to its closed position so that the limited amount of material that can flow through the gate as it closes from the pinched position to the closed position is not enough to cause an objectionable deviation from the desired final maximum charge amount.

3. One-step mode of operation

The gate is opened to its fully open position after basket preparation. When the basket is nearly filled, as indicated by the charge thickness determining apparatus, that is when a predetermined amount of charge material slightly less than the desired maximum amount has been loaded into the basket, the loading gate is closed rapidly to the pinched position. Thereafter, when the charge thickness determining apparatus indicates that the maximum desired charge volume has been received by the basket, the loading gate is closed rapidly to its fully closed position.

Figure 3:
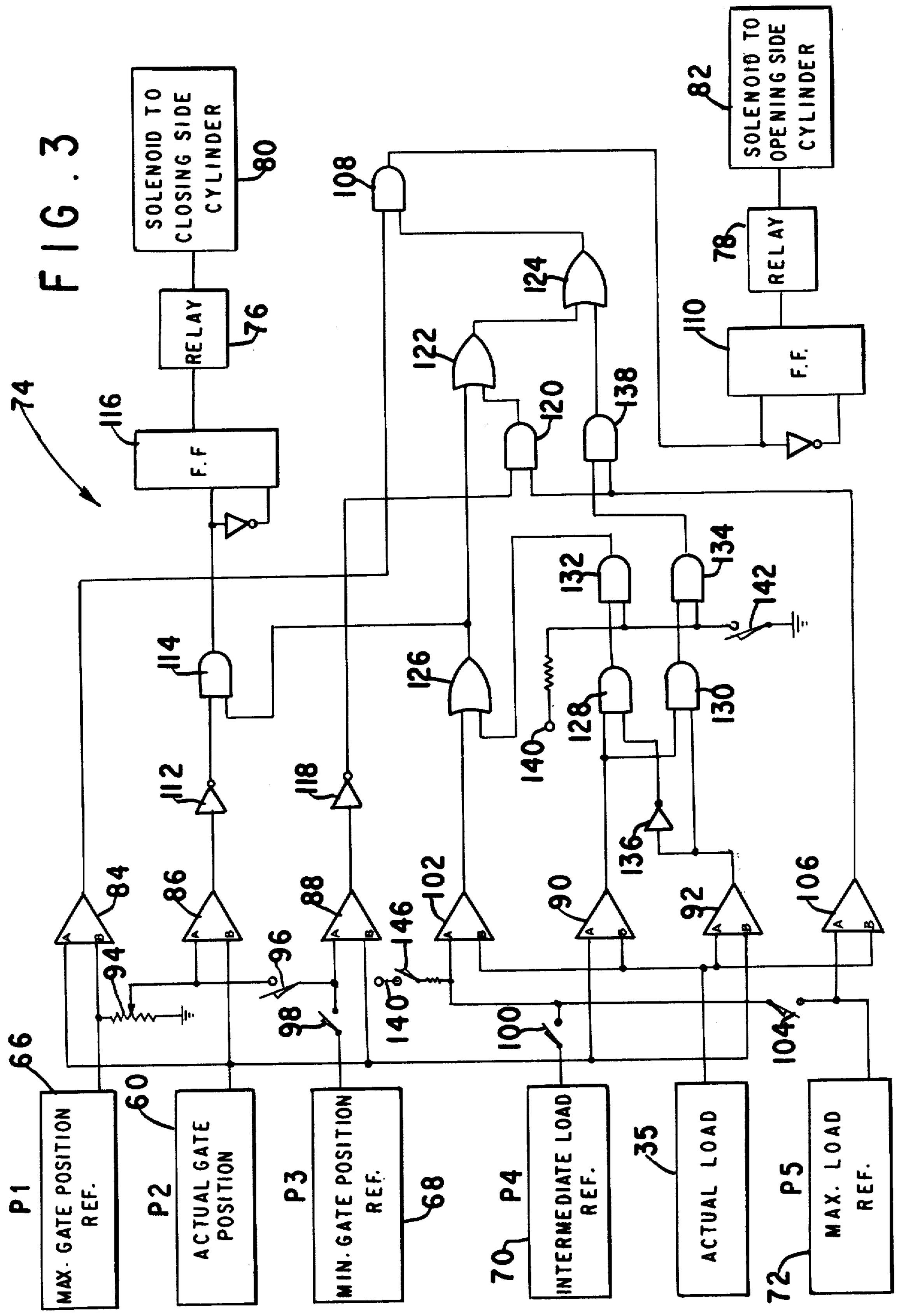
FIG. 3 is a diagram of the circuit for controlling operation of the loading gate in response to changes sensed in the thickness of charge material in the centrifugal basket of the machine.

The modes of loading gate operation are controlled by the logic circuit shown in FIG. 3. This circuit includes the transducer device 60, shown diagramatically as a gate position sensor, and the apparatus for determining the thickness of charge material in the basket 35 shown diagramatically as a charge thickness sensor. The circuit further includes a series of reference signal generators including a maximum gate position reference signal generator 66 (hereinafter "maximum gate generator") and a minimum or pinched gate position reference signal generator 68 (hereinafter "pinched gate generator"), which respectively generate signals representing the maximum gate position and the pinched position. The circuit further comprises an intermediate charge thickness reference signal generator 70 (hereinafter "intermediate thickness generator") which generates an intermediate charge signal indicative of that charge, slightly less than the maximum desired charge amount at which the gate is closed to the pinched position in the one-step and servo modes of operation. The circuit also comprises a maximum charge thickness reference signal generator 72 (hereinafter "maximum thickness generator") that generates a maximum charge signal indicative of basket charge thickness corresponding to a full basket load.

Each of the signal generators described above is connected through a logic network, generally indicated at 74, to two relays 76 and 78 that respectively actuate and deactuate a solenoid valve 80 to control the supply of compressed air to the closing side of the loading gate controlling the piston and cylinder devices 56 and 54 and a solenoid valve 82 to control the supply of compressed air to the opening side of the piston and cylinder devices.

The logic network 74 is arranged as follows:

The gate position signal generated by the transducer 60 is conducted to a series of voltage comparators 84, 86, 88, 90 and 92 and specifically to the A inputs of comparators 84 and 90 and the B inputs of comparators 86, 88 and 92. The maximum gate position reference signal produced by generator 66 is conducted to the B input of comparator 84, through a potentiometer 94 to the A input of comparator 86, and through a switch 96 to the A input of comparator 88. The pinched gate position reference signal produced by generator 68 is conducted through a switch 98 to the A input of comparator 88. The intermediate charge thickness signal produced by generator 70 is conducted through a switch 100 to the A input of a voltage comparator 102 and through a second switch 104 to the A input of another voltage comparator 106. The control signal generated by the apparatus 35 for determining charge thickness is conducted to the A input of comparator 92, and to the B inputs of the comparators 102, 90 and 106. Finally, the maximum charge thickness produced by generator 72 is conducted to the A input of comparator 106 and through switch 104 to the A input of comparator 102.

Each of the comparators is arranged to produce an enabling or active signal at its output when the signal at its B input is greater than or equal to the signal at its A input. Conversely an inactive signal is produced when the signal at the A input is greater than the signal at the B input.

Voltage comparator 84 is connected to one input of an AND gate 108, the output of which operates a flipflop 110 that controls the relay 78.

The output of voltage comparator 86 is conducted to an inverter 112 and then to one input of an AND gate 114, the output of which controls a flipflop 116 that operates relay 76.

The output of voltage comparator 88 is conducted to an inverter 118 and then to one input of an AND gate 120 which is in turn connected to one input of an OR gate 122. The output of the OR gate 122 is conducted to one input of an OR gate 124, the output of which is, in turn, conducted to the other input of AND gate 108.

The output of voltage comparator 102 is conducted to one input of an OR gate 126, the output of which is conducted to both the other input of AND gate 114 and the other input of OR gate 122.

The output of voltage comparator 90 is conducted to one input of each AND gates 128 and 130, the outputs from which are respectively conducted to one input of successive AND gates 132 and 134.

The output from voltage comparator 92 is conducted to the other input of AND gate 130 and through an inverter 136 to the other input of AND gate 128. The output from AND gate 134 is conducted to one input of AND gate 138, the output from which in turn is conducted to one input of the OR gate 124. The output from AND gate 132 is conducted to the other input of OR gate 126. The other inputs to AND gates 132 and 134 are connected to ground through a switch 142 to a constant voltage source 140.

The output from voltage comparator 106 is conducted to the other input of each AND gate 120 and 138. A switch 146 connects the voltage source 140 to the A input of voltage comparator 102.

By selectively operating the switches described above, the logic network can be connected to operate the loading gate in any of the three modes described in detail above in response to the control signal generated by the gate apparatus 35 and the gate position signal generated by the transducer 60.

Specifically, in order to operate the loading gate in the open-shut mode, switches 96, 104 and 142 are closed; all other switches remain open. Accordingly, the intermediate load reference signal generator 70 and minimum position gate position reference signal generator 68 are disconnected from the network 74. Moreover, voltage comparators 90 and 92 are rendered inoperative since the AND gate network comprising AND gates 128, 130, 132 and 134 is disabled by connection to ground. When the circuit is energized at the initiation of a centrifuging cycle, after conclusion of preparation of the basket to receive charge, the actual gate position signal generated by the transducer 60 is less than the maximum gate position reference signal generated by the reference signal generator 66. The potentiometer 94 is set to yield a signal equal to ninety percent (90%) of the maximum position reference for practical reasons. This percentage is considered the maximum open position for purposes of operation of the circuit. However, if desired, the potentiometer may be eliminated, the maximum open position being that determined by the physical parameters of the apparatus.

At the time of cycle initiation, the actual gate position signal is less than the maximum gate position signal. Further, the actual charge thickness is less than the maximum desired thickness. Therefore, AND gates 114 and 108 are enabled energizing solenoid valves 80 and 82 to cause the gate to open.

When the actual gate position equals the 90% of maximum signal as determined by potentiometer 94, the AND gate 114 is disabled, causing the flipflop 116 to reset and open the closing side solenoid valve 80. Therefore, the loading gate is balanced at its position at 90% of its maximum position and charge material flows into the centrifugal basket. When the charge equals the maximum desired amount AND gate 108 is disabled resetting flipflop 110 to cause the closing side solenoid valve to cause the cylinder to close. Thereupon, the gate moves to its closed position.

In the servo mode of operation, switches 98 and 146 are closed. Accordingly, the minimum gate position reference signal generator is connected to the network 74. Again, the gate is opened by logic performed by the circuit at the initiation of a centrifugal cycle. When the gate reaches its 90% maximum open position, the flipflops are set so that the opening and closing side solenoids both supply air to the piston and cylinder devices, thereby holding the gate at its position. The charge material is permitted to flow into the basket. When the signal representing the charge thickness from the apparatus 35 exceeds the signal representing the actual gate position from the transducer 90, with the gate at its maximum position, logic is performed to cause the gate to close. Similarly, when the charge thickness signal exceeds the gate position signal, even with the gate at a position closed from its maximum position, the gate continues to close. However, when filling has been slowed to a degree such that the charge thickness signal equals the gate position signal with the gate at less than its maximum position, the gate position is held. When the charge thickness signal again exceeds the gate position signal, the gate is moved toward its closed position. Hence, the gate is gradually closed to a pinched position as charge material is fed to the basket. That is, when the charge thickness signal equals the gate position signal and the gate is at its pinched position, the pinched position is held. Similarly, when the gate position signal exceeds the charge thickness signal and the charge thickness signal indicates less than a full charge has been delivered to the basket, the gate is held at its pinched position. Finally, when the basket is fully loaded, as indicated by the charge thickness signal, the gate is closed rapidly to its fully closed position.

In order to select the one-step mode of operation, switches 98, 100 and 142 are closed, connecting signal generator 68 and 70 to the network. When the centrifuging cycle is initiated, the loading gate is moved to its position at 90% of maximum open. When the loading gate reaches this position, it is held thereat. When the load equals the nearly full amount as indicated by the intermediate load reference signal generator, the gate is moved rapidly to its pinched position, as indicated by the intermediate minimum gate position reference signal. Finally, when the basket has received a full charge, the gate is rapidly closed to its closed position.

It will be appreciated that the control circuitry and electric thickness determining apparatus of the present invention described in detail above permits the centrifugal machine to be operated with increased flexibility and accuracy to fill the centrifugal basket with a desired charge of material. Moreover, it has been found that the one-step mode of operation provides extremely accurate filling of the centrifugal basket to its desired maximum amount. The one-step mode also provides rapid filling since the gate is not gradually closed to its pinched position but rather charge material is fed as rapidly as possible until the pinched position is required.

Accordingly, although specific embodiments of the present invention have been described above in detail, it is to be understood that this is for purposes of illustration. Modification may be made to the described structure and method in order to adapt this system to particular applications.

What is claimed is:

1. The method of determining the thickness of a charge wall being formed in a charge space against the side wall of a rotating centrifugal basket by a flow of charge material into the basket, which comprises establishing a capacitance across the charge space of the basket between two spaced capacitor plates, one of said plates being spaced inwardly of said charge space, and sensing a change of said capacitance which results as the inner surface of said charge wall approaches said one capacitor plate when the thickness of said charge wall formed in said charge space is increased by said flow.

2. A method according to claim 1, said one plate comprising an electrically conductive plate disposed inwardly of said charge space and the other of said plates comprising said side wall, said capacitance being established by forming an electric field between said electrically conductive plate and said side wall.

3. A method according to claim 1 or 2 and for controlling said thickness, which further comprises curtailing said flow in response to a sensed change of said capacitance.

4. A method according to claim 3, said curtailing being effected by discontinuing said flow when said capacitance reaches a value corresponding to a desired maximum thickness of the charge wall.

5. A method according to claim 3, said curtailing being effected by substantially diminishing said flow when said capacitance reaches a value near to its value at a desired maximum thickness of the charge wall and discontinuing said flow when said capacitance reaches a value corresponding to said desired thickness.

6. A method according to claim 3, said curtailing being effected by gradually diminishing said flow in response to sensed changes of said capacitance and discontinuing said flow when said capacitance reaches a value corresponding to a desired maximum thickness of the charge wall.

7. In a centrifugal apparatus including a rotary centrifugal basket and means for delivering a flow of charge material into the basket while the basket is rotated to form a charge wall against the side wall of the basket in a charge space; the improvement including means for determining the thickness of the charge wall comprising capacitor means for establishing a capacitance across the charge space of the basket, said capacitor means including two spaced capacitor plates one of which is spaced inwardly of said charge space, and means for sensing a change of said capacitance resulting as the inner surface of said charge wall approaches said one plate during the formation and consequent increase in thickness of said charge wall in the charge space within the basket.

8. Apparatus according to claim 7, said one of said capacitor plates including an electrically conductive plate disposed in the basket inwardly of said charge space and the other of said capacitor plates including said side wall; said capacitor means further comprising means for forming an electric field between said conductive plate and said side wall.

9. Apparatus according to claim 7 or 8, further comprising means for curtailing said flow in response to a change of said capacitance sensed by said sensing means.

10. Apparatus according to claim 9 and wherein said delivering means includes a loading gate and gate operating means for moving said gate between fully open and closed positions thereof to control said flow of charge material, said curtailing means including means responsive to the sensing by said sensing means of a certain value of said capacitance, corresponding to a desired maximum thickness of said charge wall, for activating said gate operating means to move said gate to said closed position.

11. Apparatus according to claim 10, said curtailing means further including means responsive to the sensing by said sensing means of a value of said capacitance near to said certain value for activating said gate operating means to move said gate from fully open position to a pinched open position.

12. Apparatus according to claim 10, said curtailing means further including means responsive to the sensing by said sensing means of certain changes of said capacitance for activating said gate operating means to move said gate from fully open position gradually to closed position.

13. Apparatus according to claim 8, said sensing means including a bridge circuit connected with said side wall and said plate, said bridge circuit being balanced at a value of said capacitance existing when said charge space contains air only and being operative during flow of charge material into said basket to generate a control signal varying in magnitude with the thickness of the resulting charge wall.

14. Apparatus according to claim 13, said bridge circuit being operative during such flow to generate a said control signal varying over a range from about 4 to about 28 milliamperes.

15. Apparatus according to claim 13 or 14 wherein, said control signal varies as an inverse proportion with the thickness of said resulting charge wall, the absence of said control signal indicating at least a charge wall thickness equivalent to a fully charged basket.

16. Apparatus according to claim 13 or 14, and wherein said delivering means includes a loading gate and gate operating means for moving said gate between fully open and closed positions to control said flow of charge material, said apparatus further including means responsive to certain magnitudes of said control signal for activating said gate operating means to move said gate from fully open position to a pinched open position and thereafter to closed position when said capacitance reaches a value corresponding to a desired maximum thickness of the charge wall.

17. In centrifugal apparatus including a rotary centrifugal basket, a loading gate, and gate operating means for moving said gate between fully open and closed positions thereof to control a flow of charge material and for delivering said flow of charge material into the basket while the basket is rotating to thereby form a charge wall against the side wall of the basket; the improvement including means for determining the thickness of the charge wall comprising means for establishing a capacitance across the charge space of the basket; means for sensing a change of said capacitance resulting from the formation of a charge wall in the basket; and means for curtailing said flow in response to a change of said capacitance sensed by said sensing means, said curtailing means including means responsive to the sensing by said sensing means of a certain value of said capacitance, corresponding to a desired maximum thickness of said charge wall, for activating said gate operating means to move said gate to said closed position.

18. Apparatus according to claim 17, said means for establishing said capacitance including an electrically conductive plate disposed in the basket inwardly of said charge space and means for forming an electric field between said plate and said side wall.

19. Apparatus according to claim 17, said curtailing means further including means responsive to the sensing by said sensing means of a value of said capacitance near to said certain value for activating said gate operating means to move said gate from fully open position to a pinched open position.

20. Apparatus according to claim 17, said curtailing means further including means responsive to the sensing by said sensing means of certain changes of said capacitance for activating said gate operating means to move said gate from fully open position gradually to closed position.

21. Apparatus according to claim 18, said sensing means including a bridge circuit connected with said side wall and said plate, said bridge circuit being balanced at a value of said capacitance existing when said charge space contains air only and being operative during flow of charge material into said basket to generate a control signal varying in magnitude with the thickness of the resulting charge wall.

22. Apparatus according to claim 21, said bridge circuit being operative during such flow to generate a said contrl signal varying over a range from about 4 to about 28 milliamperes.

23. Apparatus according to claim 21 to 22, wherein said control signal varies as an inverse proportion with the thickness of said resulting charge wall, the absence of said control signal indicating at least a charge wall thickness equivalent to a fully charged basket.

24. Apparatus according to claim 21 or 22, and wherein said delivering means includes a loading gate and gate operating means for moving said gate between fully open and closed positions to control said flow of charge material, said apparatus further including means responsive to certain magnitudes of said control signal for activating said gate operating means to move said gate from fully open position to a pinched open position and thereafter to closed position when said capacitance reaches a value corresponding to a desired maximum thickness of the charge wall.

25. In centrifugal apparatus including a rotary centrifugal basket, a loading gate, and gate operating means for moving said gate between fully open and closed positions to control a flow of charge material and for delivering said flow of charge material into the basket while the basket is rotating to thereby form a charge wall against the side wall of the basket, the improvement including means for determining the thickness of the charge wall including an electrically conductive plate disposed in the basket inwardly of said charge space; means for forming an electric field between said plate and said side wall for establishing a capacitance across the charge space of the basket; means for sensing a change of said capacitance resulting from the formation of a charge wall in the basket including a bridge circuit connected with said side wall and said plate, said bridge circuit being balanced at a value of said capacitance existing when said charge space contains air only and being operative during flow of charge material into said basket to generate a control signal varying in magnitude with the thickness of the resulting charge wall; means responsive to certain magnitudes of said control signal for activating said gate operating means to move said gate from fully open position to a pinched open position and thereafter to closed position when said capacitance reaches a value corresponding to a desired maximum thickness of the charge wall.

* * * * *